(12) United States Patent
Alexiou et al.

(10) Patent No.: US 7,907,911 B2
(45) Date of Patent: Mar. 15, 2011

(54) SCHEDULING MULTI-USER TRANSMISSION IN THE DOWNLINK OF A MULTI-ANTENNA WIRELESS COMMUNICATION SYSTEM

(75) Inventors: Angeliki Alexiou, Swindon (GB); Abdelkader Medles, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 12 days.

(21) Appl. No.: 11/204,775

(22) Filed: Aug. 16, 2005

(65) Prior Publication Data
US 2007/0042717 A1 Feb. 22, 2007

(51) Int. Cl.
H04B 7/00 (2006.01)
H04B 17/00 (2006.01)
H04W 72/00 (2009.01)
H04W 4/00 (2009.01)

(52) U.S. Cl. .............. 455/69; 455/67.11; 455/452.2; 370/329

(58) Field of Classification Search .......... 455/450, 455/452.1, 65, 67.11, 69, 453, 452.2, 451; 370/431, 445, 208, 328, 329, 332, 342, 468, 370/338
See application file for complete search history.

(56) References Cited

U.S. PATENT DOCUMENTS

| | | | | |
|---|---|---|---|---|
| 5,619,503 A * | 4/1997 | Dent | ............................ | 370/330 |
| 5,634,199 A | 5/1997 | Gerlach et al. | .................. | 455/63 |
| 5,818,829 A * | 10/1998 | Raith et al. | ..................... | 370/347 |
| 5,910,949 A * | 6/1999 | Bilstrom et al. | .............. | 370/337 |
| 5,982,760 A * | 11/1999 | Chen | ............................ | 370/335 |
| 6,038,266 A * | 3/2000 | Lee et al. | ....................... | 375/317 |
| 6,061,331 A * | 5/2000 | Conway et al. | ............... | 370/232 |
| 6,466,797 B1 * | 10/2002 | Frodigh et al. | ............. | 455/456.1 |
| 6,505,034 B1 * | 1/2003 | Wellig | ............................. | 455/69 |
| 6,526,060 B1 * | 2/2003 | Hughes et al. | ............. | 370/395.4 |
| 6,728,307 B1 | 4/2004 | Derryberry | ................... | 375/219 |
| 6,765,969 B1 * | 7/2004 | Vook et al. | ..................... | 375/259 |
| 7,006,800 B1 * | 2/2006 | Lashkarian et al. | ....... | 455/67.11 |
| 7,075,909 B1 * | 7/2006 | Iinuma | ............................ | 370/329 |
| 7,180,956 B1 * | 2/2007 | Banister | ......................... | 375/267 |
| 2002/0147507 A1 * | 10/2002 | Stanton | .......................... | 700/30 |

(Continued)

FOREIGN PATENT DOCUMENTS

WO   WO 2005055524 A1 *  6/2005

(Continued)

OTHER PUBLICATIONS

Yuan-Hwang Chen and Ching-Tai Chiang, Adaptive Beamforming Using the Constrained Kalman Filter, IEEE Transactions on Antennas and Propagation, vol. 41, No. 11, Nov. 1993.*

(Continued)

Primary Examiner — George Eng
Assistant Examiner — Christopher M Brandt
(74) Attorney, Agent, or Firm — Williams, Morgan & Amerson (57) ABSTRACT

The present invention provides a method and an apparatus for controlling a radio frequency transmission, over a downlink to at least one mobile station user among a plurality of mobile station users, from a plurality of antennas associated with a base station in a wireless communication system. The method includes tracking a channel corresponding to the mobile station user of the plurality of mobile station users based on feedback information indicative of a state of the channel therefrom. The method further includes scheduling, for the at least one mobile station user, a directional transmission based on the tracked channels of the plurality of mobile station users.

21 Claims, 7 Drawing Sheets

U.S. PATENT DOCUMENTS

| | | | |
|---|---|---|---|
| 2002/0177447 A1* | 11/2002 | Walton et al. | 455/452 |
| 2003/0036359 A1 | 2/2003 | Dent et al. | 455/63 |
| 2003/0092456 A1 | 5/2003 | Dent et al. | 455/503 |
| 2003/0152106 A1* | 8/2003 | Burmeister et al. | 370/468 |
| 2003/0161285 A1* | 8/2003 | Tiedemann et al. | 370/332 |
| 2004/0171385 A1* | 9/2004 | Haustein et al. | 455/450 |
| 2005/0003768 A1* | 1/2005 | Laroia et al. | 455/101 |
| 2005/0058095 A1* | 3/2005 | Sadri et al. | 370/329 |
| 2005/0107090 A1* | 5/2005 | Hosein | 455/453 |
| 2005/0111462 A1* | 5/2005 | Walton et al. | 370/395.4 |
| 2005/0135318 A1* | 6/2005 | Walton et al. | 370/338 |
| 2005/0136841 A1* | 6/2005 | Frank | 455/65 |
| 2005/0143084 A1* | 6/2005 | Cheng et al. | 455/452.2 |
| 2005/0163072 A1* | 7/2005 | Park et al. | 370/328 |
| 2005/0201296 A1* | 9/2005 | Vannithamby et al. | 370/241 |
| 2005/0265223 A1* | 12/2005 | Song | 370/208 |
| 2005/0270975 A1* | 12/2005 | Meylan et al. | 370/229 |
| 2006/0286995 A1* | 12/2006 | Onggosanusi et al. | 455/522 |
| 2007/0026813 A1* | 2/2007 | Khan | 455/69 |
| 2007/0281726 A1* | 12/2007 | Rey et al. | 455/522 |

FOREIGN PATENT DOCUMENTS

WO    WO 2005064872 A1 *    7/2005

OTHER PUBLICATIONS

P. Viswanath, D.N.C. Tse and R. Laroia, "Opportunistic Beamforming Using Dumb Antennas" IEEE Transactions on Information Theory, vol. 48(6), Jun. 2002.

D. Avidor, J. Ling and C. Papadias, "Jointly Opportunistic Beamforming and Scheduling (JOBS) for Downlink Packet Access," IEEE International Conference on Communications, Paris, France, Jun. 2004.

Greg Welch and Gary Bishop "An Introduction to the Kalman Filter" UNC-Chapel Hill TR 95-041, Apr. 5, 2004.

Winner Project, Deliverable 2.7, "Assessment of Advanced Beamforming and MIMO Technologies," Jan. 2005.

PCT Search Report from PCT/US2006/030543 dated Aug. 4, 2006.

Senst A. et al., "On the throughput of proportional fair scheduling with opportunistic beamforming for continuous fading states" *Vehicular Technology Conference*, 204 VTC2004-Fall. 2004 IEEE 60$^{th}$ Los Angeles, Ca. USA Sep. 26-29, 2004, Piscataway, NJ. USA, IEEE, vol. 1, pp. 300-304.

* cited by examiner

SCHEDULING MULTI-USER TRANSMISSION IN THE DOWNLINK OF A MULTI-ANTENNA WIRELESS COMMUNICATION SYSTEM

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to different users or subscribers of wireless communication devices. A wireless communications system generally includes one or more base stations (BSs) that can establish wireless communications links with mobile stations (MSs). Base stations may also be referred to as access points. A wireless communications link between a mobile station (MS) and a base station (BS) may use an uplink from a mobile station to a base station and a downlink in the reverse direction.

Using the uplink and downlink, both control and user information may be transmitted between the mobile station and the base station over an air interface that may use a suitable wireless communications medium, such as radio frequency (RF) signals. To establish the wireless communications link for a connection or session, the base station typically includes radio transceivers to transmit and receive radio frequency signals. Over the uplink, signaling information and user information may be received over the air interface at a base station. Over the downlink, signaling information and user information may be transmitted over the air interface on designated radio frequency channels from a base station.

For example, the downlink of a wireless communication system from a base station having a multiplicity of antennas, $N_t$, may serve a plurality of users, $K$, that generally compete for the same wireless communication resources. A user terminal, such as the mobile station may comprise a receive antenna or a multiplicity of receive antennas. Using user channels, transmissions from the base station to the MS may be performed in time slots, e.g., of size $T$, over the downlink. Different user channels may remain constant during a time slot but may change from one time slot to another time slot. In the base-band complex representation, the received signal of the $k^{th}$ user ($k=1 \ldots K$) is given by $y_k(n)=h_k(n)x(n)+v_k(n)$, (1) where $y_k(n):1 \times T$ is the received signal, $h_k(n):1 \times N_t$ is the $k^{th}$ user channel at time slot n, $x(n):N_t \times T$ is the transmitted signal at the BS and $\{v_k(n):1 \times T\}_{n,k}$ is a sequence of complex random vectors with a distribution $CN(0, \sigma^2 I_T)$. The transmitted power is fixed to $P(E(\|x(n)\|^2)=TP)$, and denote the Signal to Noise Ratio (SNR) by $$\rho = \frac{P}{\sigma^2}.$$

$\| \|$ refers to the Frobenius norm.

The base station may serve a single user at a given time. However, when serving a plurality of users, the base station may schedule transmissions to different users so as to optimizing the network performance of a wireless network. To maximize the wireless communication system capacity, the base station may transmit to the user with the best instantaneous channel. However, such a solution may fail to ensure fairness in the allocation of resources among users. Moreover, this solution may result in rendering a poor quality of service based on increased delays and reduced throughput for users with low mobility and/or to users that may be located at a relatively large distance from the base station.

For a base station with a single transmit antenna, one approach that provides fairness and desired service delivery involves Proportional Fair Scheduling (PFS). To ensure fairness in the allocation of resources among users under a given maximum delay constraint of $T_c$ time slot, a scheduling algorithm based on the PFS uses the single transmit antenna at the base station. In this algorithm, each user has a requested data rate $R_k(n)$ based on the feedback from the user terminal, such as the mobile station to the base station. The scheduling algorithm decides to transmit to user $k^*$ with the largest $$\frac{R_k(n)}{T_k(n)},$$

among all active users where $$k^* = \arg \max_k \frac{R_k(n)}{T_k(n)},$$

(2) and $T_k(n)$ being the average throughputs may be updated as follows $$T_k(n+1) = \begin{cases} \left(1 - \frac{1}{T_c}\right)T_k(n) + \frac{1}{T_c}R_k(n), & k = k^* \\ \left(1 - \frac{1}{T_c}\right)T_k(n), & k \neq k^* \end{cases}$$

where $R_k(n)$ is based on the channel feedback received at the base station.

Considering that the base station may obtain complete knowledge of the instantaneous channels of all users, and considering Gaussian input and powerful code, the base station may achieve the channel capacity given by $R_k(n)=\ln_2(1+\rho|h_k(n)|^2)$, where $| \, |$ refers to the norm of a complex scalar. Although inherently the scheduling algorithm based on the PFS assumes that the user channels vary smoothly enough for $R_k(n)$ to be about the same from one time slot to the following slot, the scheduling algorithm based on the PFS becomes inefficient in the case of a slowly varying environment where the channel fluctuation is of a small magnitude.

To improve performance, a wireless communication system may utilize multiple-input/multiple-output (MIMO) communications techniques. The MIMO communications techniques typically use multiple antennas to wirelessly transmit and receive signals at high speeds, increasing capacity of a wireless network. For example, a MIMO wireless network may use multiple antennas at a mobile terminal and a base station. To enable a MIMO wireless network to provide a high-speed mobile data transmission, a base station may comprise a multiplicity of antennas, obtaining gains in spatial processing. For a multi-antenna approach, some specific benefits of spatial processing include gains of beamforming, spatial multiplexing and spatial diversity. That is, spatial processing in a multi-antenna approach may leverage basic gains including an array gain, a diversity gain, a spatial multiplexing gain, and an interference suppression gain.

Use of a multi-antenna technique may be integrated in a radio access network for a transceiver of the base station and a receiver, such as mobile station having a plurality of antennas. Since use of a multiplicity of antennas at the base station may involve beamforming, the scheduling algorithm based on the PFS designed for a single antenna may be inadequate for the multi-antenna approach. Use of beamforming enables implementation of directional transmission in a MIMO wireless network. For example, beamforming use multiple antennas to focus beams in certain spatial directions to leverage array and interference rejection gains. In the single-link case, the transmitter and/or receiver adapts its antenna weights according to the amount of channel knowledge and can thus achieve array gain. In the multi-user case, beamforming enables spatial selectivity by allocation of different antenna weights to different users, thereby achieving interference rejection and multi-user diversity gains.

To provide a high-speed data transmission, one beamforming approach uses an Opportunistic Beamforming (OB) for a base station having a multiplicity of transmit antennas. The opportunistic beamforming uses a random beamforming vector $w(n):N_t \times 1$ to increase artificially the channel dynamics. The received signal then takes the form $y_k(n)=h_k(n)w(n)b(n)+v_k(n)$ with $\|w(n)\|^2=1$. The sequence $w(n)$ may vary slowly enough, for the overall channel gain $|h_k(n)w(n)|$ to remain approximately the same from one slot to the next slot. Applying the PFS, for an OB based scheduling algorithm, the feedback quantifies as $|h_k(n-1)w(n-1)|$ and the requested data rate for Gaussian input may be given by $R_k(n)=\ln_2(1+\rho|h_k(n-1)w(n-1)|^2)$.

By using the multi-user diversity gain, the random opportunistic beamforming may generally enhance performance. However, in some cases, such an OB based scheduling algorithm may fail to provide any performance gain and suboptimal processing may instead result in a loss in performance. For example, when use of the OB based scheduling algorithm is compared to the case where channels are fully known at the base station and the PFS is used, the OB based scheduling algorithm provides a relatively lower performance for any $w(n)$. That is, the gain $|h_k(n)w(n)| \leq \|h_k(n)\|$ turns out to be lower than the optimal beamforming where $$w(n) = \frac{h_k^H(n)}{\|h_k(n)\|}.$$

The difference in performance becomes significant particularly in the case of limited number of users and/or a relatively small maximum delay constraint $T_c$.

Furthermore, the OB based scheduling algorithm introduces a changing beam that reduces the reliability of the feedback and degrades the performance of a wireless communication system. The use of optimal beamforming may enable a wireless communication system to achieve the maximum possible gain. However, this approach translates into relatively higher requirements of feedback rate for the channel state information.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one illustrative embodiment of the present invention, a method is provided for controlling a radio frequency transmission, over a downlink to at least one mobile station user among a plurality of mobile station users, from a plurality of antennas associated with a base station in a wireless communication system. The method includes tracking a channel corresponding to the at least one mobile station user based on feedback information indicative of a state of the channel therefrom. The method further includes scheduling, for the at least one the mobile station user, a directional transmission based on the tracked channels of the plurality of mobile station users.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time consuming, but may nevertheless be a routine undertaking for those of ordinary skill in the art having the benefit of this disclosure.

Generally, a method and an apparatus are provided for controlling a radio frequency transmission, over a downlink to a plurality of users, from a multiplicity of antennas associated with a base station in a wireless communication system. The method includes tracking the channel corresponding to each user of the plurality of users based on feedback information indicative of the channel state therefrom. The method further includes scheduling a user for a directional transmission to the mobile station of the user among a plurality of mobile stations based on the tracked channels. In this way, multi-user transmission may be scheduled in a downlink from multiple antennas of a base station in a high-speed wireless data network. The multi-user scheduling may use the channel state information available at a transmitter of an access point, for example, a base station in the form of quantized feedback to track the user channels and transmit to (schedule) the plurality of users with the best channel conditions using optimal beamforming weights. Such multi-user scheduling with channel tracking may maximize the system capacity for multiple-input/multiple-output communications. Different user channels may be reconstructed based on a low rate feedback that quantizes the channel seen from each user. A multi-user scheduling context may be used for the purposes of this reconstruction while keeping a receiver architecture at a plurality of mobile stations relatively simple with minor modifications at the base stations.

Figure 1:
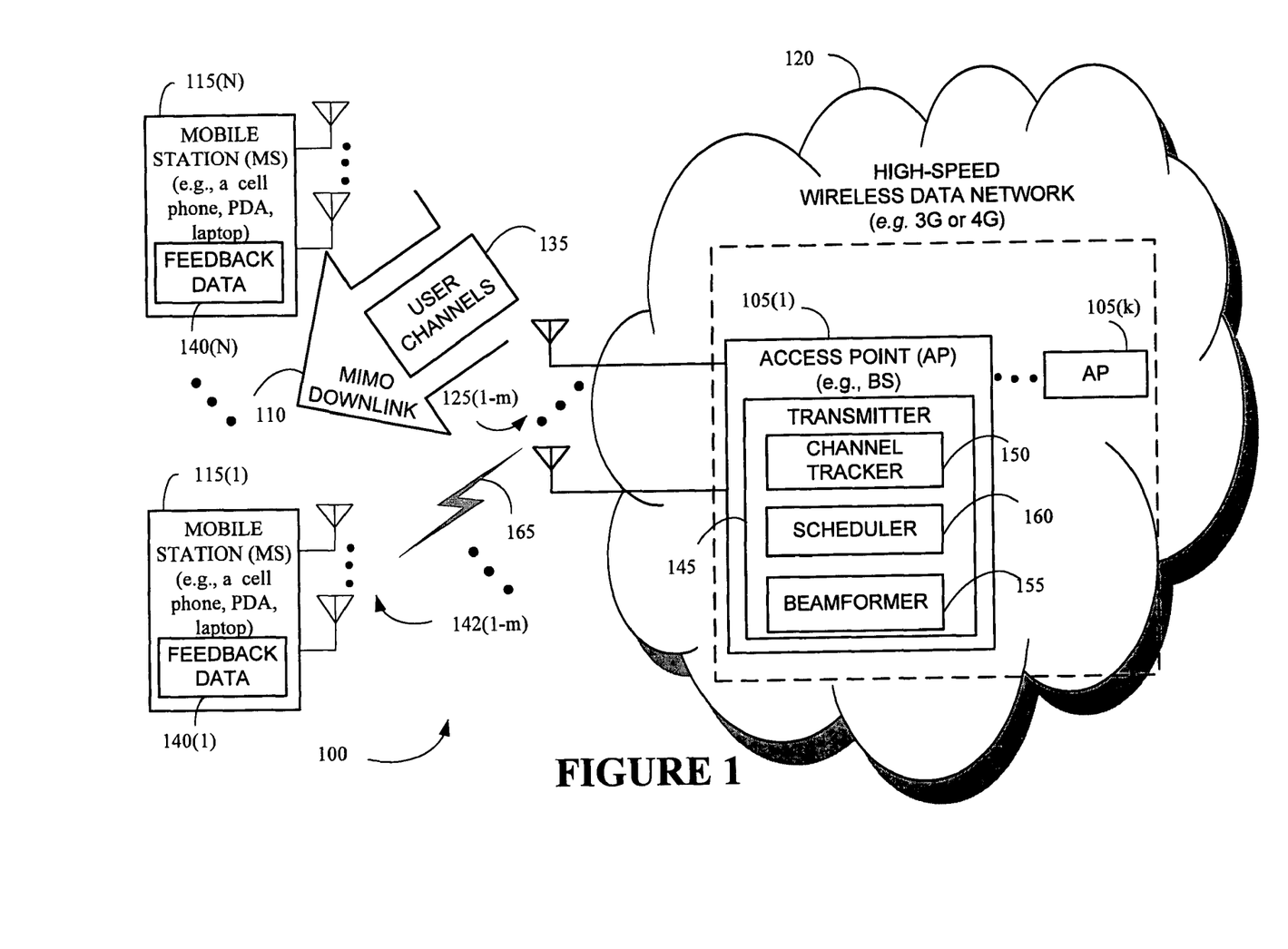
FIG. 1 schematically depicts a wireless communication system capable of multiple-input/multiple-output (MIMO) communications and includes an access point, such as a base station that may schedule multi-user transmission in a downlink from antennas of the base station according to one illustrative embodiment of the present invention.

Referring to FIG. 1, a wireless communication system 100 capable of multiple-input/multiple-output (MIMO) communications is illustrated to include first and second access points (APs), such as first and second base station (BSs) 105(1-k) that may schedule multi-user transmission in a downlink 110 associated with a multi antenna environment according to one illustrative embodiment of the present invention. In the wireless communication system 100, the first and second base stations 105(1-k) may provide the wireless connectivity over a wireless network, such as a high-speed wireless data network 120 to a plurality of mobile stations (MSs) 115(1-N).

The high-speed wireless data network 120, such as a cellular network may use any one or more of desirable radio access techniques or protocols. Examples of the radio access techniques or protocols include a Code Division Multiple Access (CDMA, cdma2000) protocol, a wideband CDMA (W-CDMA) protocol, a Universal Mobile Telecommunication System (UMTS) protocol, a Global System for Mobile communications (GSM) protocol, and like. The wireless connectivity may be provided according to any one of desirable generation of networks including third generation (3G) and fourth generation networks (4G). The wireless connectivity may be provided according to any one of desirable modulation schemes including an Orthogonal Frequency Division Multiplexing (OFDM) network that uses a modulation technique which transmits data across many carriers for high data rates and an ad-hoc network.

The first base station 105(1) may comprise a multiplicity of antennas 125(1-m) to transmit and receive MIMO communications from the plurality of MSs 115(1-N). The first base station 105(1) may control a radio frequency (RF) transmission, over the downlink 110 to a plurality of users in the wireless communication system 100. The first base station 105(1) may track the channel corresponding to each user of the plurality of users, i.e., user channels 135 based on feedback 140(1-N) information indicative of the channel state from the users. The first base station 105(1) may schedule a user for a directional transmission to the mobile station 115(1) of the user among the plurality of mobile stations 115(1-N) based on the tracked user channels 135. The mobile station 115(1) may comprise a multiplicity of antennas 142(1-N) to transmit and receive MIMO communications from the first base station 105(1).

To enable the RF transmission to the plurality of mobile stations 115(1-N), the first base station 105(1) may comprise a transmitter 145. For tracking the user channels 135, the transmitter 145 may further comprise a channel tracker 150. The transmitter 145 may comprise a beamformer 155 to generate a plurality of indications for the directional transmission based on the tracked user channels 135. The transmitter 145 may further comprise a scheduler 160 to schedule the user for a directional transmission to the mobile station 115(1) of the selected user.

Using the multiplicity of antennas 125(1-m) associated with the first base station 105(1), the transmitter 145 may transmit the radio frequency transmission to the mobile station 115(1) of the scheduled user. The first base station 105(1) may use an indication of an estimate of the channel of the scheduled user based on an availability of samples of the feedback 140(1) information associated with the tracked user channels 135.

Each mobile station 115 of the plurality of mobile stations 115(1-N) may estimate a channel gain for the channel of the corresponding user. The first base station 105(1) may receive the channel gain from each mobile station of the plurality of mobile stations 115(1-N) in a feedback signaling as a quantized feedback. By controlling a feedback data rate of each mobile station of the plurality of mobile stations 115(1-N), based on a target level of feedback information, the feedback data rate may be reduced to a rate that provides a desired feedback rate control. To provide the desired rate feedback control, the wireless communication system 100 may use an adaptive feedback loop Although two base stations 105(1-k) are shown in FIG. 1, persons of ordinary skill in the pertinent art having benefit of the present disclosure should appreciate that any desirable number of base stations 105 may be used. Each of the first and second base stations 105(1-k), sometimes referred to as access points, may provide connectivity to associated geographical areas within the high-speed wireless data network 120. Although the high-speed wireless data network 120 is shown to include the first and second base stations 105(1-k) in FIG. 1, persons of ordinary skill in the art should appreciate that portions of the high-speed wireless data network 120 may be suitably implemented in any number of ways to include other components using hardware, software, or a combination thereof. High-speed wireless data networks are known to persons of ordinary skill in the art and so, in the interest of clarity, only those aspects of the high-speed wireless data network 120 that are relevant to the present invention will be described herein.

The mobile station 115(1) may move across overlapping coverage zones referred to as cells of the base stations 105 (1-k). However, the mobile station 115(1) may communicate simultaneously to two or more cells, or in some cases with two sectors on the same cell, permitting a call to continue even though the signal from any one cell would not be strong enough to keep the call up. Examples of the mobile stations 115(1-N) may include a host of wireless communication devices including, but not limited to, cellular telephones and personal digital assistants (PDAs that employ the wireless communication system 100 to operate in the high-speed wireless data network 120. Other examples of the mobile station 115 may include smart phones, text messaging devices, and the like.

In the wireless communication system 100, mobile communications that communicate the messages between the first base station 105(1) and the mobile station 115(1) may occur over an air interface 165 via a radio frequency (RF). Consistent with one embodiment, the downlink 110 may provide messages to the plurality of mobile stations 115(1-N). The messages may include traffic packets and signaling messages. The mobile station 115(1) may transmit messages to the first base station 105(1) over a reverse link (not shown).

The channel tracker 150 at the first base station 105(1) may track the user channels 135 using a low feedback rate that enables the beamformer 155 to perform an optimal beamforming. To this end, in one embodiment, the scheduler 160 uses a scheduling algorithm based on a Proportional Fair Scheduling (PFS) for performing multi-user scheduling.

The multi-user scheduling may use the channel state information available at the transmitter 145 in the form of quantized feedback to track the user channels 135 and transmit to (schedule) the plurality of users with the best channel conditions using optimal beamforming weights. Such multi-user scheduling with channel tracking may maximize the system capacity of the wireless communication system 100 for MIMO communications. The first base station 105(1) may reconstruct the different user channels 135 based on a low rate feedback that quantizes the channel seen from each user. The multi-user scheduling context may be used for the purposes of this reconstruction while keeping a receiver (not shown) architecture at the plurality of mobile stations 115(1-N) relatively simple with minor modifications at the first base station 105(1).

In this way, the wireless communication system 100 may optimize multi-user scheduling in the first base station 105(1) comprising a multiplicity of antennas 125(1-m) for MIMO communications. By using the low rate feedback signaling, both scheduling (of the user with best channel conditions) and the transmit beamforming weights may be optimized. Instead of using proportional fair scheduling for single antenna, the wireless communication system 100 may use multi antenna gain. Likewise, the wireless communication system 100 may obtain the optimal beamforming gain rather than using opportunistic beamforming. No modification of the receiver may be desired where no multi-antenna processing (estimation/detection) is provided. Since the channel tracking may be performed in an adaptive/real time, for example, using Kalman filtering, the BS complexity of the first base station 105(1) may not be significantly impacted.

The beamformer 155 may provide a space-time filter using a sequence of beamforming weights. The beamforming may maximize the signal to noise ratio based on the tracked user channels 135.

By using the beamformer 155, such as a random beamformer, the wireless communication system 100 may avoid the feedback of each full channel of the user channels 135. As a result, significant savings in overhead signaling occur, especially in the case of the use of multiple antennas. This limited amount of feedback signaling may be allocated to the feedback 140(-1 m) information of the channel complex gain seen by each user. By using a desired sequence of beamforming weights w(n), the first base station 105(1) may track the user channels 135 of the different users. Each mobile station 115 may estimate the corresponding user channel gain and transmit the channel gain to the first base station 105(1) as a quantized feedback report. For example, the quantized feedback report may be denoted by $$\alpha_k(n) = h_k(n-1)w(n-1) + \eta_k(n),$$

where $\eta_k(n)$ denotes the error introduced by the quantized feedback, it may be based on a zero mean complex Gaussian distribution $\eta_k(n) \sim CN(0, \sigma_\eta^2)$ and may account for the estimation and quantization error of the complex gain $h_k(n-1)w(n-1)$. In the illustrated embodiment, the different user channels 135 may vary in time based on a conventional autoregressive model. For such an autoregressive model, the channel may be a linear combination of the past realizations and a parameter related to the channel dynamics. One exemplary autoregressive model that uses the least a priori information is known as the AR(1), according to which the state evolution equation of the channel is $h_k(n) = \lambda_k h_k(n-1) + u_k(n)$, where $\lambda_k$ is the parameter related to the channel dynamics $|\lambda_k| < 1$. $u_k(n)$ denotes the channel of user k at time slot 'n' and is based on a zero mean complex Gaussian distribution $u_k(n) \sim CN(0, \sigma_{u_k}^2 I_{Nt})$ with variance $\sigma_{u_k}^2 = (1-|\lambda_k|^2)\sigma_{h_k}^2$.

For the joint gaussianity of the actual channel and channel estimates, the a posteriori distribution of $h_k(n)$ given $(\alpha_k(n), \alpha_k(n-1), \ldots)$ is Gaussian with mean $\hat{h}_k(n) = E(h_k(n)|\alpha_k(n), \alpha_k(n-1), \ldots)$ and covariance $\hat{C}_k(n) = E((h_k(n) - \hat{h}_k(n))^H(h_k(n) - \hat{h}_k(n)))$. The mean $\hat{h}_k(n)$ corresponds to the minimum mean square error estimate of $h_k(n)$. The real time estimation (tracking) of $h_k(n)$ may be performed, with low computational complexity, using a Kalman filtering algorithm for each user.

The Kalman filter delivers $(\hat{h}_k(n), \hat{C}_k(n))$ based on the actual feedback measurements $\alpha_k(n)$ and the past estimate $(\hat{h}_k(n-1), \hat{C}_k(n-1))$, using the following update equations:

$$\begin{cases} K_k(n-1) = \dfrac{w^H(n-1)\hat{C}_k(n-1)}{w^H(n-1)\hat{C}_k(n-1)w(n-1) + \sigma_\eta^2} \\ \hat{h}_k^+(n-1) = \hat{h}_k(n-1) + K_k(n-1)(\alpha_k(n) - \hat{h}_k(n-1)w(n-1)) \\ \hat{C}_k^+(n-1) = \hat{C}_k(n-1)[I_{Nt} - w(n-1)K_h(n-1)] \\ \hat{h}_k(n) = \lambda_k \hat{h}_k^+(n-1) \\ \hat{C}_k(n) = |\lambda_k|^2 \hat{C}_k^+(n-1) + \sigma_{u_k}^2 I_{Nt} \end{cases} \quad (3)$$

The channel tracking based on Kalman filtering may be independent of the choice of beamforming weights w(n). The estimate of the channel of each user enables the use of the conventional beamforming instead of the opportunistic beamformer (OB). Thus, when transmitting to user k, i.e., to the mobile station 115(1), the first base station 105(1) may use the estimated channel as the actual channel. The first base station 105(1) may use the corresponding beamforming vector $$w(n) = \frac{\hat{h}_k^H(n)}{\|\hat{h}_k(n)\|},$$

and apply the selection procedure of (2) based on $$R_k(n) = Throughput_k(n) = \max_{R>0} Prob\left(\ln_2\left(1 + \rho \frac{|\hat{h}_k^H(n)h_k(n)|^2}{\|\hat{h}_k(n)\|}\right) > R\right). \quad (4)$$

$R_k(n)$ can be evaluated in a numerically efficient way using the a posteriori distribution of $h_k(n)$:$h_k(n) \sim CN(\hat{h}_k(n), \hat{C}_k(n))$.

However, persons of ordinary skill in the art having benefit of the present disclosure should appreciate that the present invention is not limited to the Kalman filtering. In alternative embodiments, a suitable filter may enable the first base station 105(1) to provide different capabilities and/or additional capabilities to control the multi-user transmission in the downlink 130.

Figure 2:
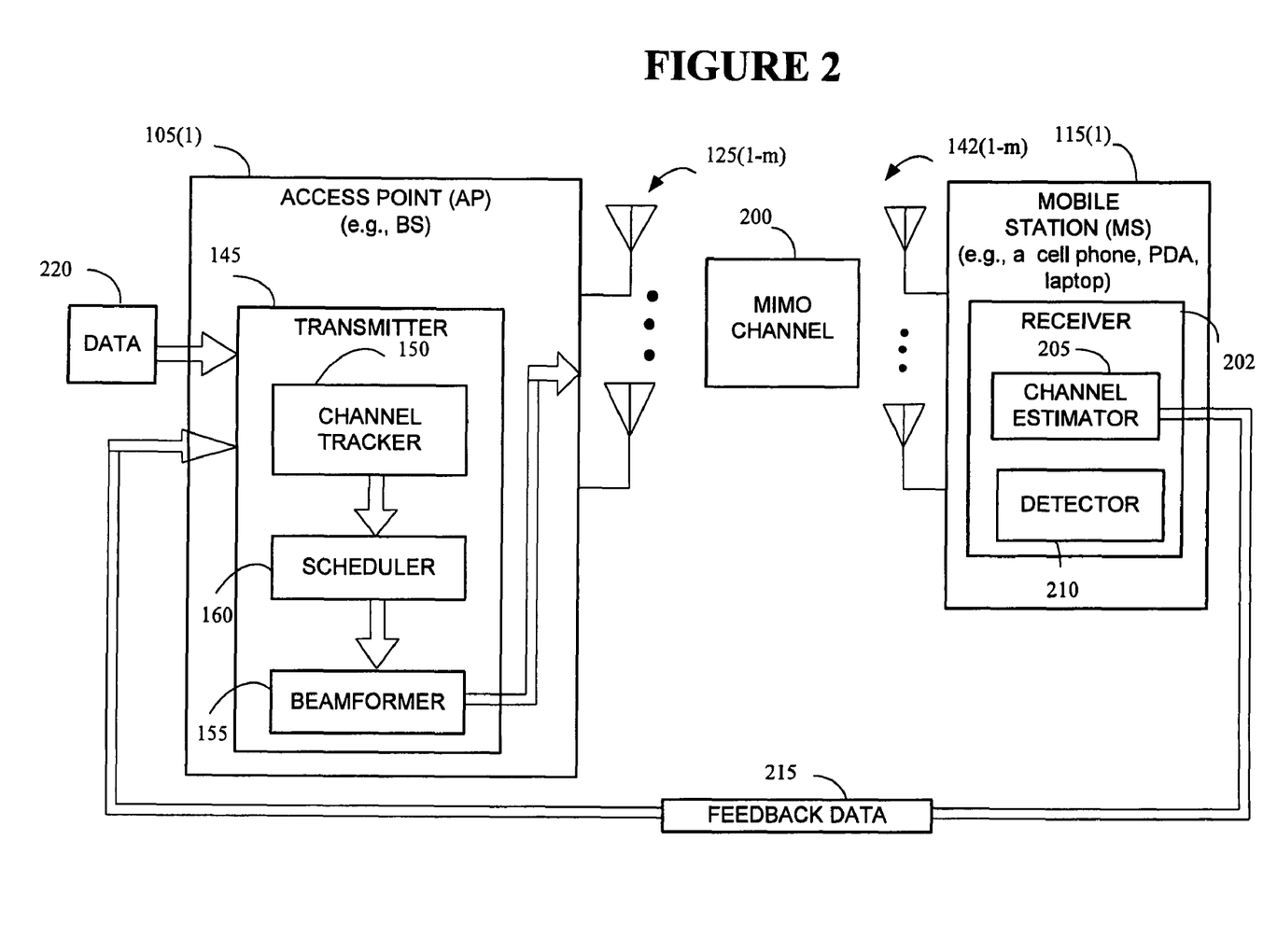
FIG. 2 schematically depicts the base station to include the channel tracker, scheduler and beamformer and the mobile station to include the channel estimator and detector for controlling a radio frequency transmission to a plurality of users over a downlink in a MIMO channel according to one illustrative embodiment of the present invention.

Turning now to FIG. 2, the first base station 105(1) is schematically depicted to include the channel tracker 150, the scheduler 160 and the beamformer 155 for controlling a radio frequency (RF) transmission to a plurality of users over the downlink 110 in a MIMO channel 200 according to one illustrative embodiment of the present invention. In addition, the mobile station 105(1) is shown to include a receiver 202 that comprises a channel estimator 205 and a detector 210. The MIMO channel 200 may enable a multi-user mobile communication involving a multi-antenna/multi-user signal processing.

For the downlink 110, the channel state information at the first base station 105(1) or access point (AP) enables processing of signals from active users, significantly improving performance and substantially increasing data rates. When channel state information becomes available at the first base station 105(1) as feedback data 215, the transmitter 145 may reduce multi-user interference by beamforming based on the channel state information. The first base station 105(1) employs the multiplicity of antennas 125(1–m) to obtain spatial multiplexing gains by transmitting different data streams via each available antenna. By using only limited channel state information being fed back as indications of channel quality signalled by the mobile station 115(1), the transmitter 145 may select a suitable user for scheduling.

The transmitter 145 may provide beamforming for a multi-user mobile communication using a multi-antenna/multi-user signal processing. In most propagation conditions, energy reaches the receiving terminal only via a subsection of the solid angle in space. The energy transmitted in other directions is generally lost for the receiver and even creates harmful interference to other receivers. The beamforming based on the channel state information from the mobile station 115(1) may concentrate the transmitted energy in relevant areas or equivalently to receive energy from preferred directions. Thus, the energy may be transmitted in directions for the receiver 202, i.e., the mobile station 115(1) that may not create harmful interference to other mobile station 115. The associated gain obtained based on such beamforming may result in an increase in the signal to noise ratio (SNR) of the downlink 110. Such beamforming may improve the interference conditions by actively controlling or avoiding interference with an increase in directivity of the RF transmission of data 220 and the corresponding reduction in frequency and time variances.

Figure 3:
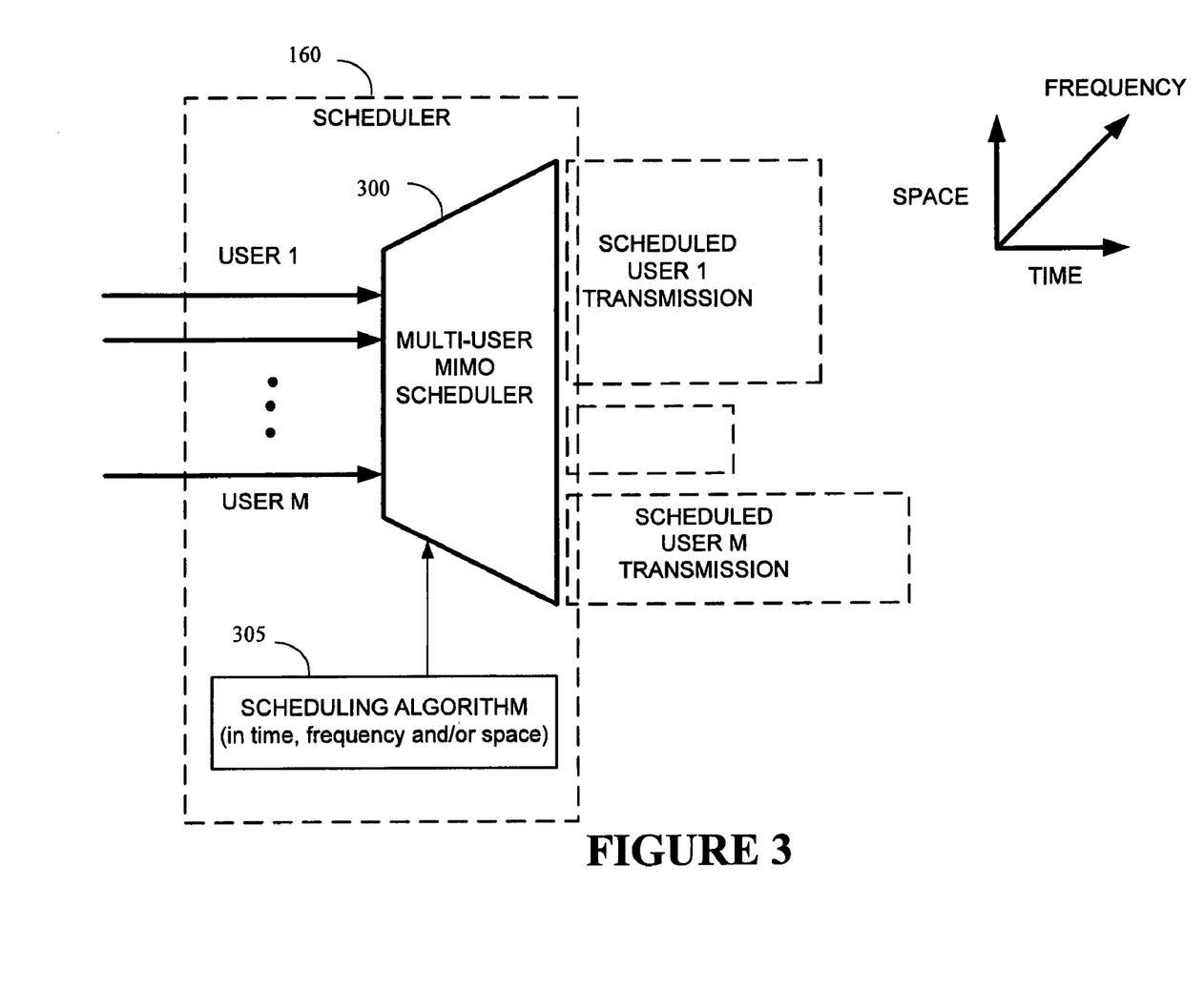
FIG. 3 schematically depicts a multi-user MIMO scheduler that uses a scheduling algorithm in time, frequency and/or space consistent with an exemplary embodiment of the present invention.

Referring to FIG. 3, the scheduler shown in FIG. 1 is schematically depicted to include a multi-user MIMO scheduler 300 that uses a scheduling algorithm 305 in time, frequency and/or space consistent with an exemplary embodiment of the present invention. In one embodiment, the multi-user MIMO scheduler 300 may schedule a user from the plurality of users with a relatively better channel condition among the monitored channel conditions. To schedule the selected user from the plurality of users, the multi-user MIMO scheduler 300 may use a plurality of antenna gains with the desired beamforming gain.

The multi-user MIMO scheduler 300 may use a multi-user scheduling context to provide a given maximum system capacity target for the wireless communication system 100. Based on the multi-user scheduling context in a wireless data network, such as the high-speed wireless data network, the multi-user MIMO scheduler 300 may optimize a scheduling performance indicator of the downlink 110. To provide the multi-user scheduling context in the high-speed wireless data network 120, the multi-user MIMO scheduler 300 may optimize a performance indicator of a beamforming weight vector. In this way, the multi-user MIMO scheduler 300 may schedule the selected user for a directional transmission to the mobile station 105 of the user.

To track the channel corresponding to each user of the plurality of users for the multi-user MIMO scheduler 300, the channel tracker 150 may use Kalman filtering in an adaptive time. Alternatively, the channel tracker 150 may track the channel corresponding to each user of the plurality of users in a real time using Kalman filtering.

Consistent with one embodiment, the scheduling algorithm 305 may be based on the conventional proportional fair scheduling technique. The scheduling algorithm 305 may schedule the directional transmission of the plurality of users in time, frequency, and/or space dimensions from the multiplicity of antennas 125(1–k) at the first base station 105(1). To schedule a user for a directional transmission to the mobile station 115(1) of the user, the first base station 105(1) may allocate feedback signaling to obtain the feedback data 215 of a channel complex gain of each channel of the user channels 135 at the first base station 105(1). The first base station 105(1) may be enabled to obtain a sequence of beamforming weights for maximizing throughput of the downlink 110. A space-time filter may use the sequence of beamforming weights to provide beamforming to maximize the signal to noise ratio based on the tracked user channels 135, in one embodiment.

Figure 4:
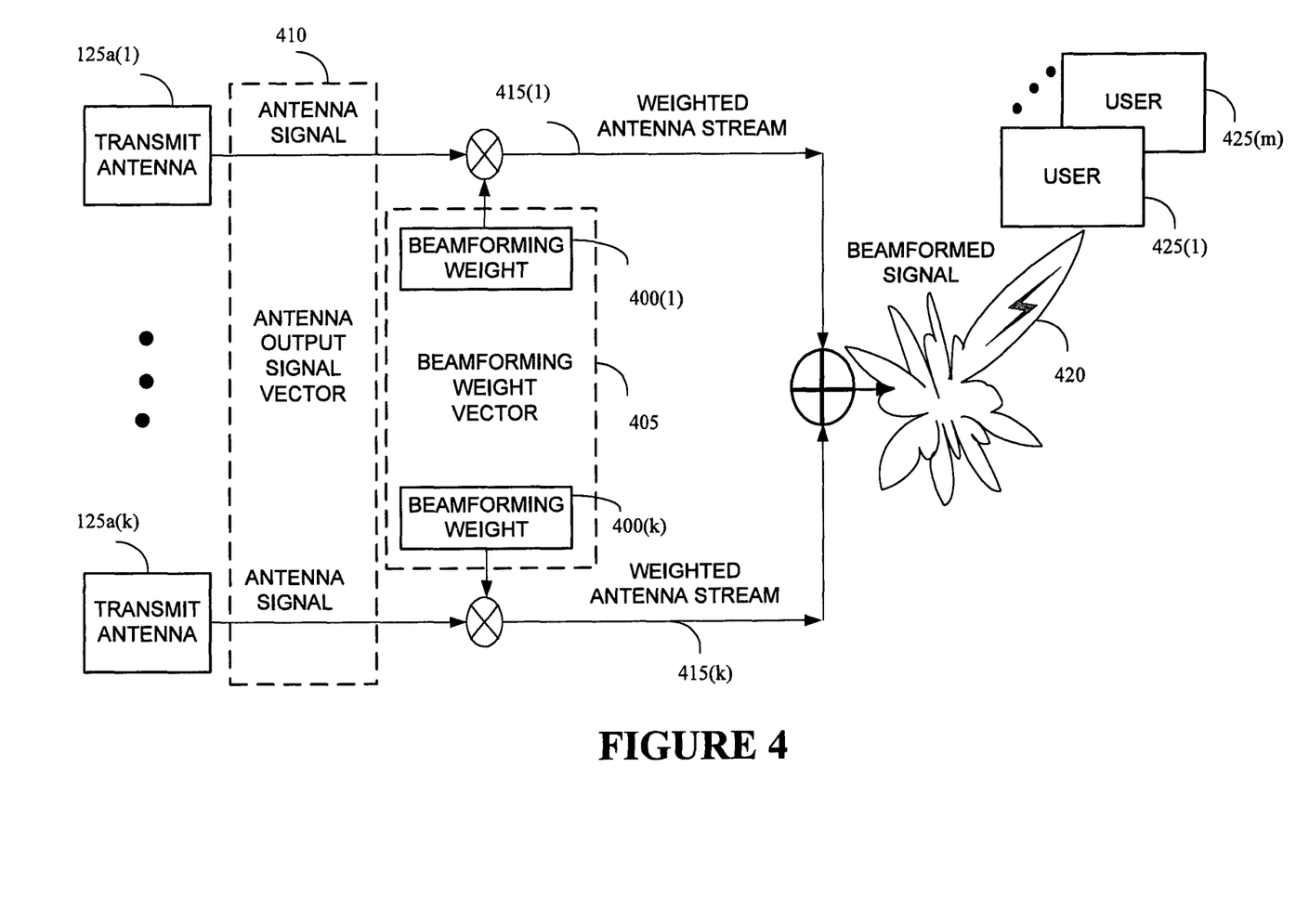
FIG. 4 illustrates a stylized representation for using beamforming weights in a space-time filter to optimize beamforming transmission at the base station in the wireless communication system shown in FIG. 1, according to one embodiment of the present invention.

Turning now to FIG. 4, a stylized representation is illustrated for using beamforming weights 400(1–k) in a space-time filter to optimize beamforming transmission at the first base station 105(1) in the wireless communication system 100 shown in FIG. 1, according to one embodiment of the present invention. The beamforming weights 400(1–k) may provide a desired beamforming using the multiplicity of antennas 125(1–k) to transmit the radio frequency transmission to the scheduled user based on the monitored channel conditions. To this end, the beamformer 155 may multiply a beamforming weight vector 405 that provides a desired beamforming gain to an antenna output signal vector 410 for the multiplicity of antennas 125(1–k), such as transmit antennas 125a(1–k). A plurality of weighted antenna streams 415 (1–k) may be combined to provide a beamforming signal 420 to a selected user 425(1) of a plurality of users 425(1–m).

Figure 5:
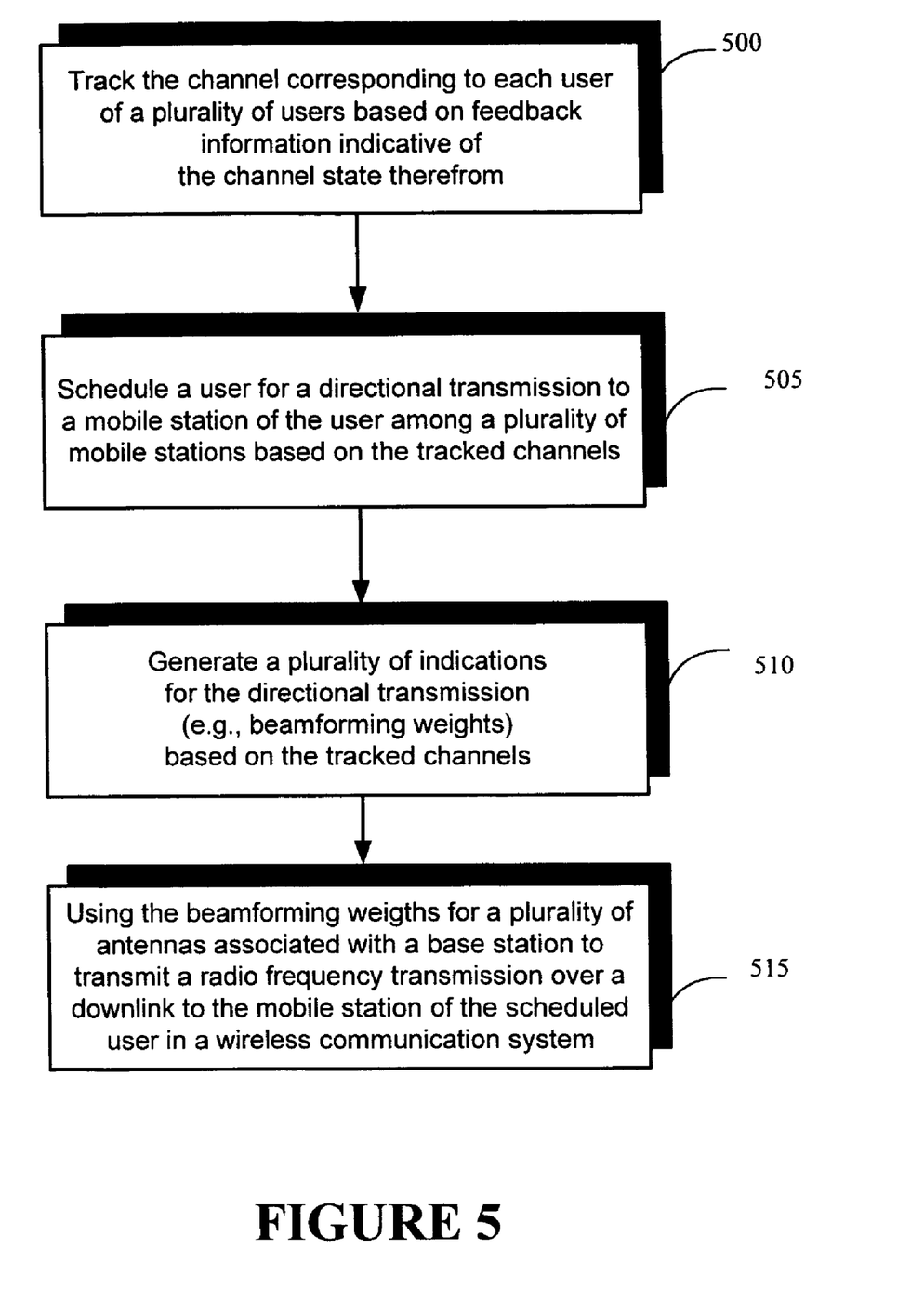
FIG. 5 illustrates a stylized representation for implementing a method of controlling a radio frequency transmission, over a downlink to a plurality of users, from a multiplicity of antennas associated with a base station in the wireless communication system shown in FIG. 2 according to one illustrative embodiment of the present invention.

Referring to FIG. 5, a stylized representation is illustrated for implementing a method of controlling a radio frequency transmission, over the downlink 110 to the plurality of users 425(1–m), from the multiplicity of antennas 125(–k) associated with the first base station 105(1) in the wireless communication system 100 shown in FIG. 2 according to one illustrative embodiment of the present invention.

At block 500, the channel tracker 150 may track the channel corresponding to each user of the plurality of users 425 (1–m), i.e., user channels 135 based on the feedback 140(1–N) information indicative of the channel state from the users. At block 505, the multi-user MIMO scheduler 300 may schedule the user 425(1) for a directional transmission to the mobile station 115(1) of the user among the plurality of mobile stations 115(1–N) based on the tracked user channels 135, as shown in block 510. The beamformer 155 may generate a plurality of indications, e.g., the beamforming weights 400(1–k) for the directional transmission based on the tracked user channels 135. Using the beamforming weights 400(1–k) for the plurality of antennas 125(1–k), the transmitter 145 may transmit a radio frequency (RF) transmission for the scheduled or selected user 425(1) as a directional transmission over the downlink 110 to the mobile station 115(1) of the selected user. In this manner, the first base station 105(1) may control the RF transmission in the wireless communication system 100, as indicated in block 515.

Figure 6:
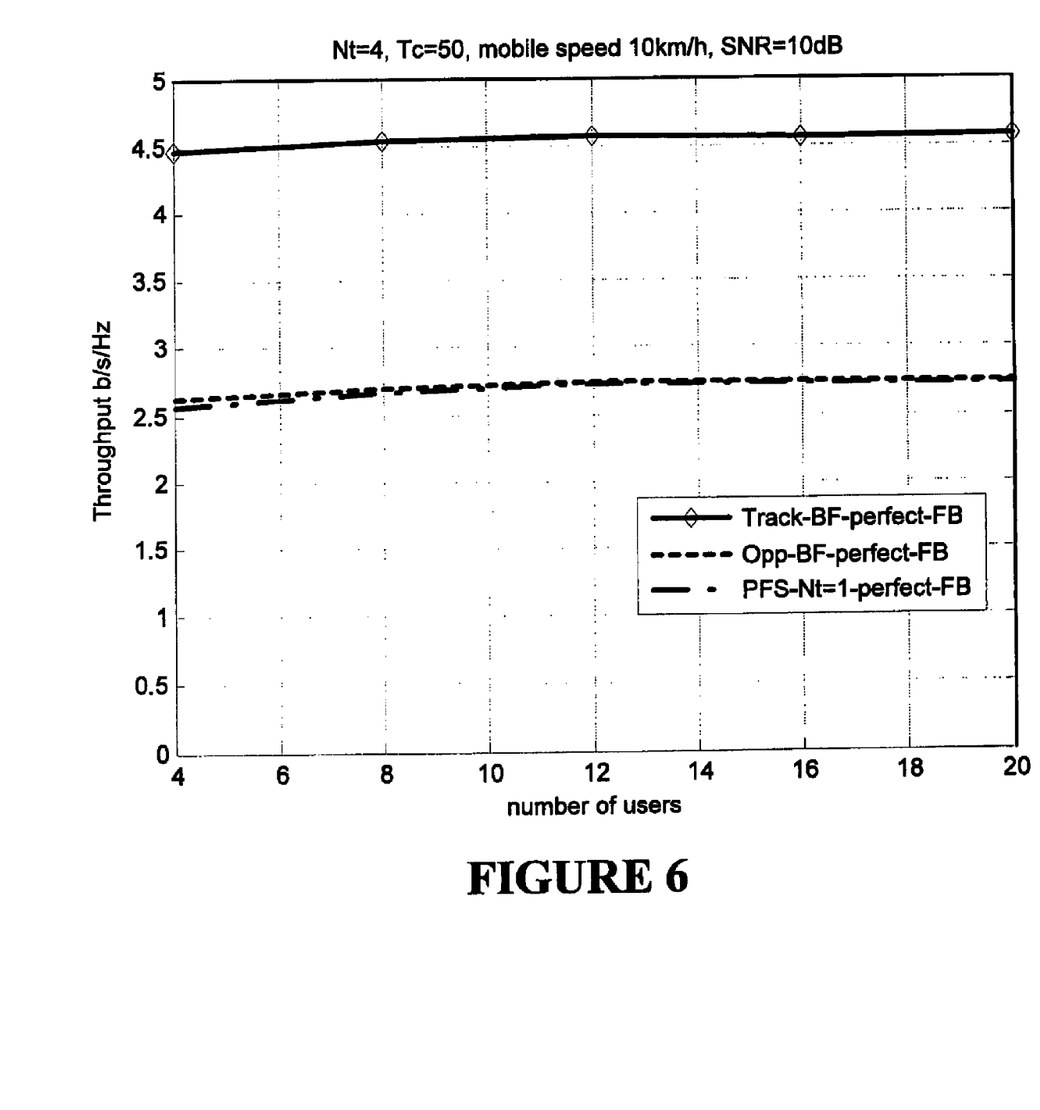
FIG. 6 shows a comparison of performance gains using a conventional PFS algorithm for a single transmit antenna, an opportunistic beamforming for multi transmit antennas and an optimized multi-user MIMO scheduling with channel tracking according to one illustrative embodiment of the present invention.

Referring to FIG. 6, a comparison of performance gains is illustrated using a conventional PFS algorithm for a single transmit antenna, an opportunistic beamforming for multi transmit antennas and an optimized multi-user MIMO scheduling with channel tracking according to one illustrative embodiment of the present invention. The achieved performance gains of the conventional approach of the PFS algorithm for a single transmit antenna (PFS-Nt=1-perfect-FB), the OB (Opp-BF-perfect-FB) and the optimized multi-user MIMO scheduling with channel tracking (Track-BF-perfect-FB) are illustrated. In all three cases, ideal feedback (perfect-FB) is illustrated to ignore quantization errors.

Figure 7:
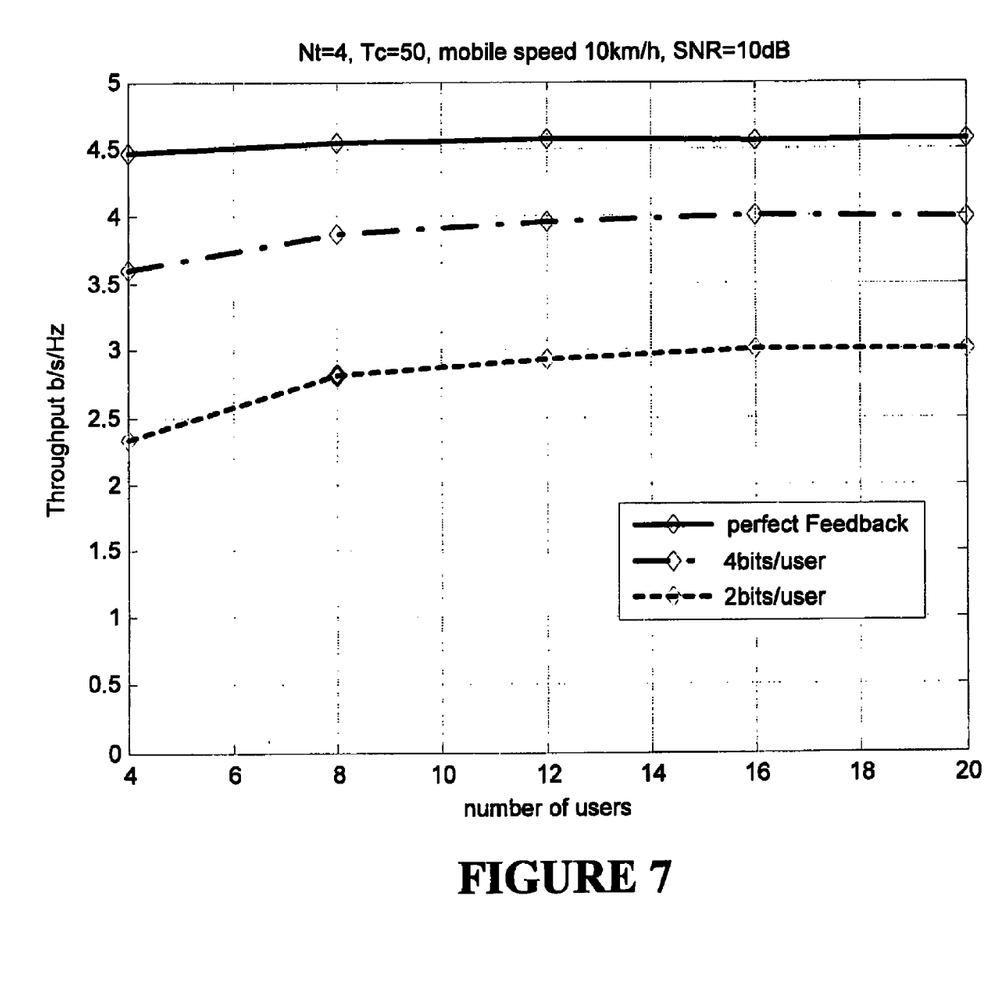
FIG. 7 shows a comparison of performance gains for the optimized multi-user MIMO scheduling with channel tracking with different feedback rates according to one illustrative embodiment of the present invention.

Finally, FIG. 7 shows a comparison of performance gains for the optimized multi-user MIMO scheduling with channel tracking with different feedback rates according to one illustrative embodiment of the present invention. In both FIGS. 6 and 7, simulations are performed for an OFDM system with 2048 FFT size. The channel is generated according to the Spatial Channel Model (SCM). The SCM model is a generalization of the third generation of partnership project (3GPP) channel model for 5 GHz center frequency and 100 MHz bandwidth. The maximum delay spread of the channel is 5 µs and each frame spans 5 OFDM symbol periods, which corresponds to 0.1 ms. We assume a delay of 2 frames between the channel measurement at the receiver, and the transmission with the updated channels estimates at the AP. All the users have the same speed of 10 km/h. The beamforming and resource allocation are applied independently per sub carrier, the number of receive antennas is fixed to $N_r=1$ and the delay constraint is fixed to $T_c=50$. Performance is described in terms of throughput (b/s/Hz) for different number of users.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring mathematical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a cellular telecommunications network environment, it also has application in other wireless environments. For example, wireless environments may include 802.11(a), 802.11(b), 802.11(g), Bluetooth, or the like. The present invention may have application in any wireless environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of controlling a radio frequency transmission, over a downlink to at least one mobile station user among a plurality of mobile station users, from a plurality of antennas associated with a base station in a wireless communication system, the method comprising:
   tracking, at the base station, a channel corresponding to the at least one mobile station user based on feedback information indicative of at least one complex channel gain seen by said at least one mobile station user, wherein the channel comprises tracking the channel using said at least one complex channel gain instead of feedback of each full channel of the user channels, the channel tracking comprising performing a real-time estimate of values of a matrix representation of the channel corresponding to said at least one mobile station user, the feedback information being provided at a rate selected by the base station; and
   scheduling, at the base station and for the at least one of the mobile station user, a directional downlink transmission based on the tracked channels of said plurality of mobile station users, said scheduling being performed using a proportionally fair algorithm.

2. A method, as set forth in claim 1, wherein scheduling a directional downlink transmission to the mobile station user further comprises:
   generating a plurality of indications for the directional downlink transmission based on the tracked channel of the scheduled mobile station user; and
   using said plurality of antennas associated with said base station to transmit the radio frequency transmission to the scheduled mobile station user.

3. A method, as set forth in claim 2, further comprising:
   using an indication of an estimate of the channel of the scheduled mobile station user based on an availability of samples of the feedback information associated with the tracked channels.

4. A method, as set forth in claim 3, further comprising:
   receiving the channel gain from said each mobile station of said plurality of mobile station users at said base station in a feedback signaling as a quantized feedback.

5. A method, as set forth in claim 4, further comprising:
   controlling, using signals transmitted from the base station to said each mobile station of said plurality of mobile station users, a feedback data rate of said each mobile station of said plurality of mobile station users; and
   reducing said feedback data rate to a rate that provides a desired feedback rate control based on a target level of feedback information.

6. A method, as set forth in claim 5, further comprising:
   using an adaptive feedback loop to provide said desired rate feedback control.

7. A method, as set forth in claim 1, further comprising:
   monitoring a channel condition of each mobile station of said plurality of mobile station users; and
   using feedback from a mobile station to obtain a desired performance at the mobile station of the scheduled mobile station user for the monitored channel condition.

8. A method, as set forth in claim 7, further comprising:
   quantizing a transmit antenna channel seen from each mobile station of said plurality of mobile station users based on said feedback; and
   reconstructing the channel of said each mobile station at said base station based on said feedback associated with the transmit antenna channels.

9. A method, as set forth in claim 8, further comprising:
   providing beamforming using said plurality of antennas to transmit the radio frequency transmission to the scheduled mobile station user based on the monitored channel conditions.

10. A method, as set forth in claim 9, wherein providing beamforming using said plurality of antennas further comprises:
    multiplying a beamforming weight vector that provides a desired beamforming gain to an antenna output signal vector for said plurality of antennas.

11. A method, as set forth in claim 7, further comprising:
    scheduling the at least one mobile station user from said plurality of mobile station users when the at least one mobile station user has a better channel condition, relative to channel conditions of the other mobile station users, among the monitored channel conditions.

12. A method, as set forth in claim 11, further comprising:
    using a plurality of antenna gains with the desired beamforming gain to schedule the at least one mobile station user from said plurality of mobile station users.

13. A method, as set forth in claim 12, further comprising:
    using a multi-user scheduling context to provide a given maximum system capacity target.

14. A method, as set forth in claim 13, further comprising:
    optimizing a scheduling performance indicator of said downlink based on said multi-user scheduling context in a wireless data network.

15. A method, as set forth in claim 14, further comprising:
    optimizing a performance indicator of a beamforming weight vector to provide said multi-user scheduling context in said wireless data network.

16. A method, as set forth in claim 2, wherein scheduling, for the at least one mobile station user, a directional downlink transmission further comprises:
    using a scheduling algorithm for said plurality of antennas at said base station to schedule for said plurality of mobile station users the directional downlink transmission in at least one of time, frequency, and space dimensions.

17. A method, as set forth in claim 2, wherein scheduling, for the at least one mobile station user, a directional downlink transmission further comprises:
    allocating feedback signaling to obtain the feedback of a channel complex gain of each channel of a plurality of user channels at said base station;

enabling said base station to obtain a sequence of beamforming weights; and causing said base station to obtain a desired channel estimate in a varying communication environment for maximizing throughput of said downlink.

18. A method, as set forth in claim 17, comprising providing beamforming based on a sequence of beamforming weights.

19. A method, as set forth in claim 18, wherein providing beamforming based on a sequence of beamforming weights comprises providing beamforming using the sequence of beamforming weights to maximize the signal to noise ratio based on the tracked channels.

20. A method of controlling a radio frequency transmission, over a downlink to at least one mobile station user among a plurality of mobile station users, from a plurality of antennas associated with a base station in a wireless communication system, the method comprising:

tracking, at the base station, a channel corresponding to the at least one mobile station user based on feedback information indicative of a state of the channel therefrom, the channel tracking comprising performing a real-time estimate of values of a matrix representation of the channel corresponding to said at least one mobile station user, the feedback information being provided at a rate selected by the base station to support scheduling of a directional downlink transmission from the base station to said at least one mobile station user over the tracked channel; wherein tracking a channel corresponding to the at least one mobile station user of said plurality of mobile station users further comprises tracking the channel corresponding to each mobile station user of said plurality of mobile station users in an adaptive time using Kalman filtering to perform the estimate of the matrix representative of the channel corresponding to said at least one mobile station user; and scheduling, at the base station and for the at least one the mobile station user, the directional downlink transmission based on the tracked channels of said plurality of mobile station users, said scheduling being performed using a proportionally fair algorithm, wherein scheduling a directional downlink transmission to the mobile station user further comprises:

generating a plurality of indications for the directional downlink transmission based on the tracked channel of the scheduled mobile station user; and using said plurality of antennas associated with said base station to transmit the radio frequency transmission to the scheduled mobile station user.

21. A method of controlling a radio frequency transmission, over a downlink to at least one mobile station user among a plurality of mobile station users, from a plurality of antennas associated with a base station in a wireless communication system, the method comprising:

tracking, at the base station, a channel corresponding to the at least one mobile station user based on feedback information indicative of a state of the channel therefrom, the channel tracking comprising performing a real-time estimate of values of a matrix representation of the channel corresponding to said at least one mobile station user, the feedback information being provided at a rate selected by the base station to support scheduling of a directional downlink transmission from the base station to said at least one mobile station user over the tracked channel; wherein tracking a channel corresponding to the at least one mobile station user of said plurality of mobile station users further comprises tracking the channel corresponding to each mobile station user of said plurality of mobile station users in a real time using Kalman filtering to perform the real-time estimate of the matrix representative of the channel corresponding to said at least one mobile station user; and scheduling, at the base station and for the at least one the mobile station user, the directional downlink transmission based on the tracked channels of said plurality of mobile station users, said scheduling being performed using a proportionally fair algorithm, wherein scheduling a directional downlink transmission to the mobile station user further comprises:

generating a plurality of indications for the directional downlink transmission based on the tracked channel of the scheduled mobile station user; and using said plurality of antennas associated with said base station to transmit the radio frequency transmission to the scheduled mobile station user.

* * * * *